(12) United States Patent
Chang et al.

(10) Patent No.: US 7,081,719 B2
(45) Date of Patent: Jul. 25, 2006

(54) COMPUTER POWER SUPPLY WITH A DISPLAY FUNCTION

(75) Inventors: Yung-Shih Chang, Tamshui Chen (TW); Yu-Hong Cheng, Chung-Ho (TW)

(73) Assignees: Cooler Master Co., Ltd., Chung-Ho (TW); Acbel Polytech Inc., Tamshui Chen (TW)

( * ) Notice: Subject to any disclaimer, the term of this patent is extended or adjusted under 35 U.S.C. 154(b) by 0 days.

(21) Appl. No.: 10/916,962

(22) Filed: Aug. 12, 2004

(65) Prior Publication Data

US 2006/0033451 A1    Feb. 16, 2006

(51) Int. Cl.
H05B 41/24      (2006.01)
G08B 21/00     (2006.01)

(52) U.S. Cl. .................. 315/247; 315/129; 363/50; 340/635

(58) Field of Classification Search ............... 340/500, 340/540, 635; 345/211–213; 363/13, 146, 363/21.01, 50; 315/247, 129
See application file for complete search history.

(56) References Cited

U.S. PATENT DOCUMENTS

| | | | | | |
|---|---|---|---|---|---|
| 4,415,855 | A | * | 11/1983 | Dubauskas | 324/114 |
| 5,793,627 | A | * | 8/1998 | Caldes et al. | 363/146 |
| 5,905,491 | A | * | 5/1999 | Kim | 363/41 |
| 5,995,400 | A | * | 11/1999 | Park et al. | 363/146 |
| 6,201,319 | B1 | * | 3/2001 | Simonelli et al. | 307/26 |
| 6,775,156 | B1 | * | 8/2004 | Lin et al. | 363/21.01 |
| 6,784,641 | B1 | * | 8/2004 | Sakai et al. | 320/132 |
| 2003/0085621 | A1 | * | 5/2003 | Potega | 307/18 |
| 2003/0214254 | A1 | * | 11/2003 | Shloush et al. | 315/247 |
| 2004/0178784 | A1 | * | 9/2004 | Okamoto | 323/283 |
| 2005/0206639 | A1 | * | 9/2005 | Chen | 345/211 |

\* cited by examiner

*Primary Examiner*—Thuy V. Tran
*Assistant Examiner*—Ephrem Alemu
(74) *Attorney, Agent, or Firm*—Dellett & Walters

(57) ABSTRACT

A computer power supply with a display function has a rectifying circuit, an EMI filter, a power factor corrector, a switching circuit, a transformer and a secondary coil voltage regulator located between an AC voltage input and a DC voltage output. A linear rectifying circuit as a major technique connects to the output of the power factor corrector to detect power dissipation and represent the result in a display, thus user can take necessary measures when a computer draws excessive power.

8 Claims, 12 Drawing Sheets

COMPUTER POWER SUPPLY WITH A DISPLAY FUNCTION

BACKGROUND OF THE INVENTION

1. Field of the Invention

The present invention relates to a computer power supply with a display function, and particularly relates to a computer power supply with a function of real-time checking and displaying a status of the computer power supply.

2. Description of Related Art

The computer power supply is a vital part in computer operating system and any abnormality in it may interrupt the operation process, and may even destroy the system device. Take a PC (personal computer) for example, different voltage supplies are presented in a BIOS (Basic Input/Output System) such as 3V, 12V, and 15V. However, as the users have to enter the BIOS at the starting up of the computer and exit from the BIOS before entering the operation system, the voltage supply information can not be obtained at any moment in the operation system, so the computer power supply information in the BIOS is of little help to the user.

The present mainboard is equipped with a built-in monitor system cooperating with application programs, so the internal temperature, input voltage status and fan speed are presented in the operation system, and only the computer power supply status information is still isolated in the BIOS.

Therefore, the invention provides a computer power supply with a display function to mitigate or obviate the aforementioned problem.

SUMMARY OF THE INVENTION

The main objective of the present invention is to provide a computer power supply with a function of real-time checking and displaying a status of the computer power supply, which can be independent of a computer operation system, thus the users can take prompt measures when necessary to prevent damage.

Another objective of the present invention is to provide a display with a caution function. The display consists of a display panel and a pointer, wherein the display panel is divided into two-color areas to classify the magnitude of the computer power supply.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
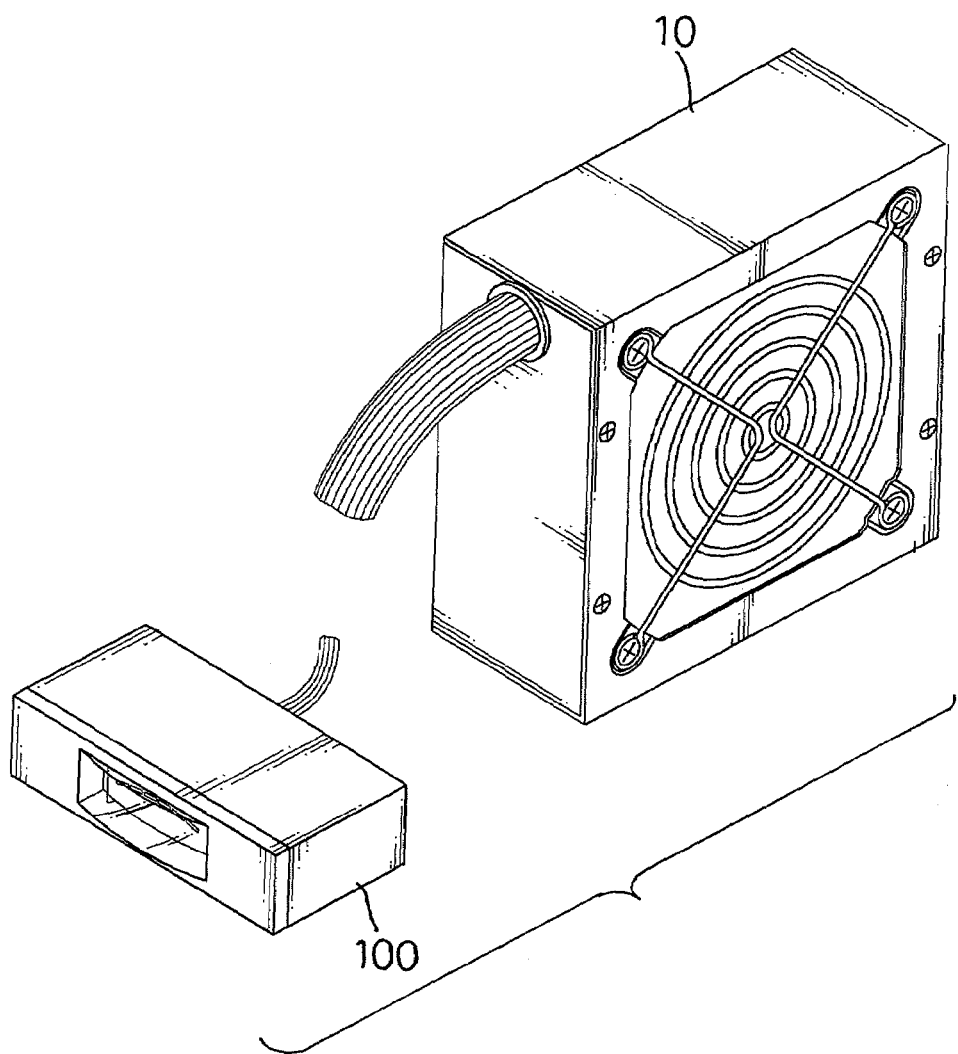
FIG. 1 is a perspective view in accordance with this invention.
Figure 2:
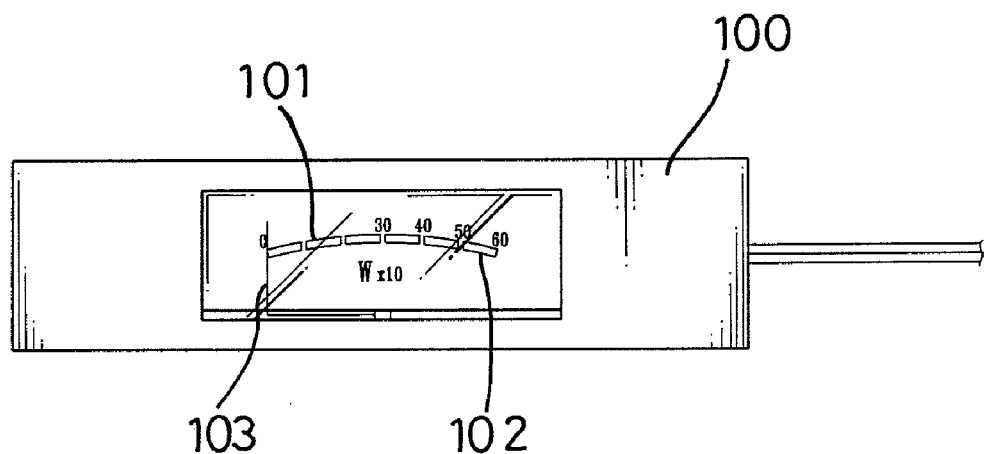
FIG. 2 is a schematic illustration of a display in accordance with this invention.

With reference to FIGS. 1–2, a computer power supply (10) is equipped with a display (100), wherein the display consists of a panel and a pointer indicating a value of load current.

Figure 3:
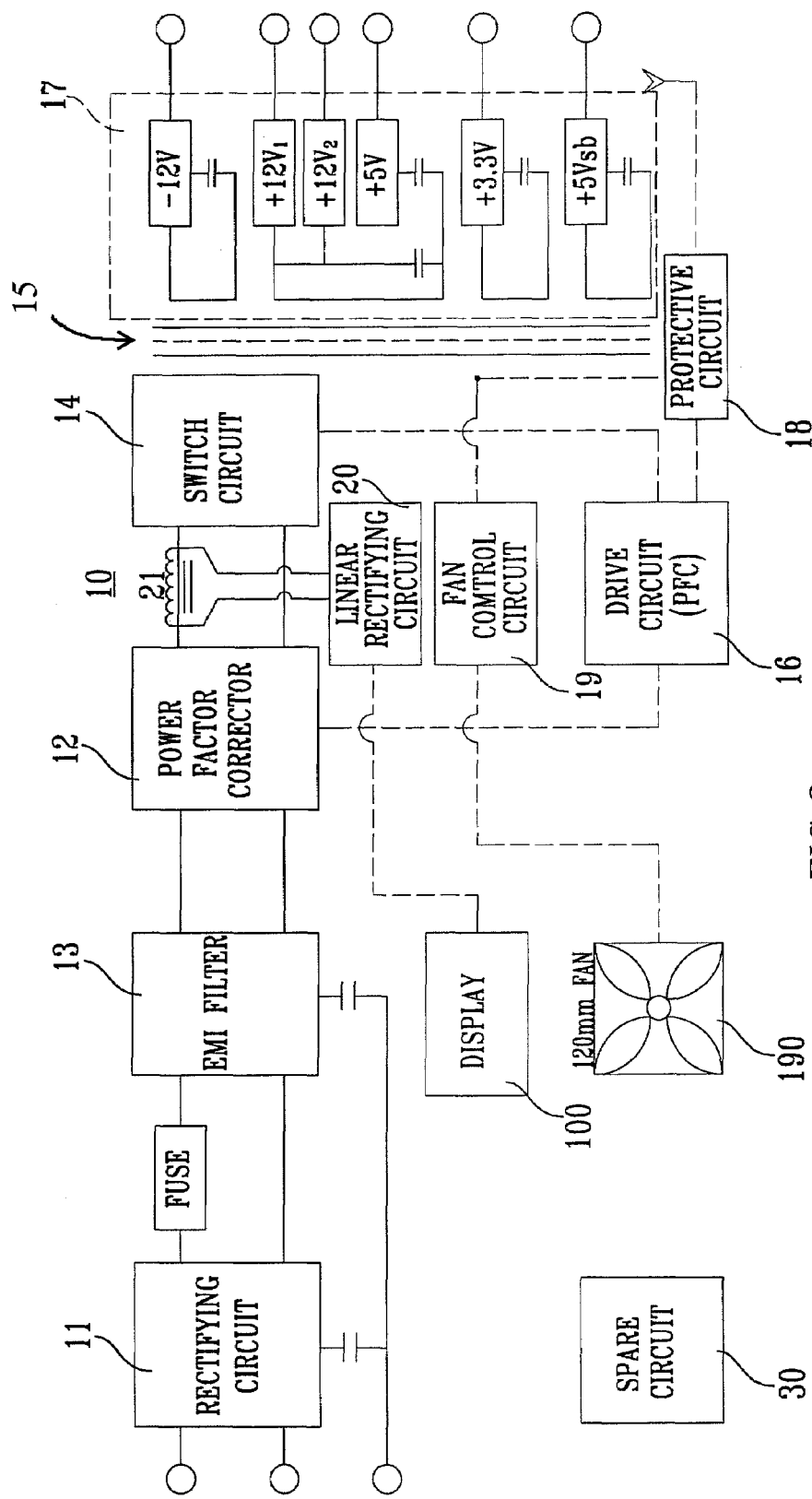
FIG. 3 is a circuit block diagram in accordance with this invention.
Figure 4A:
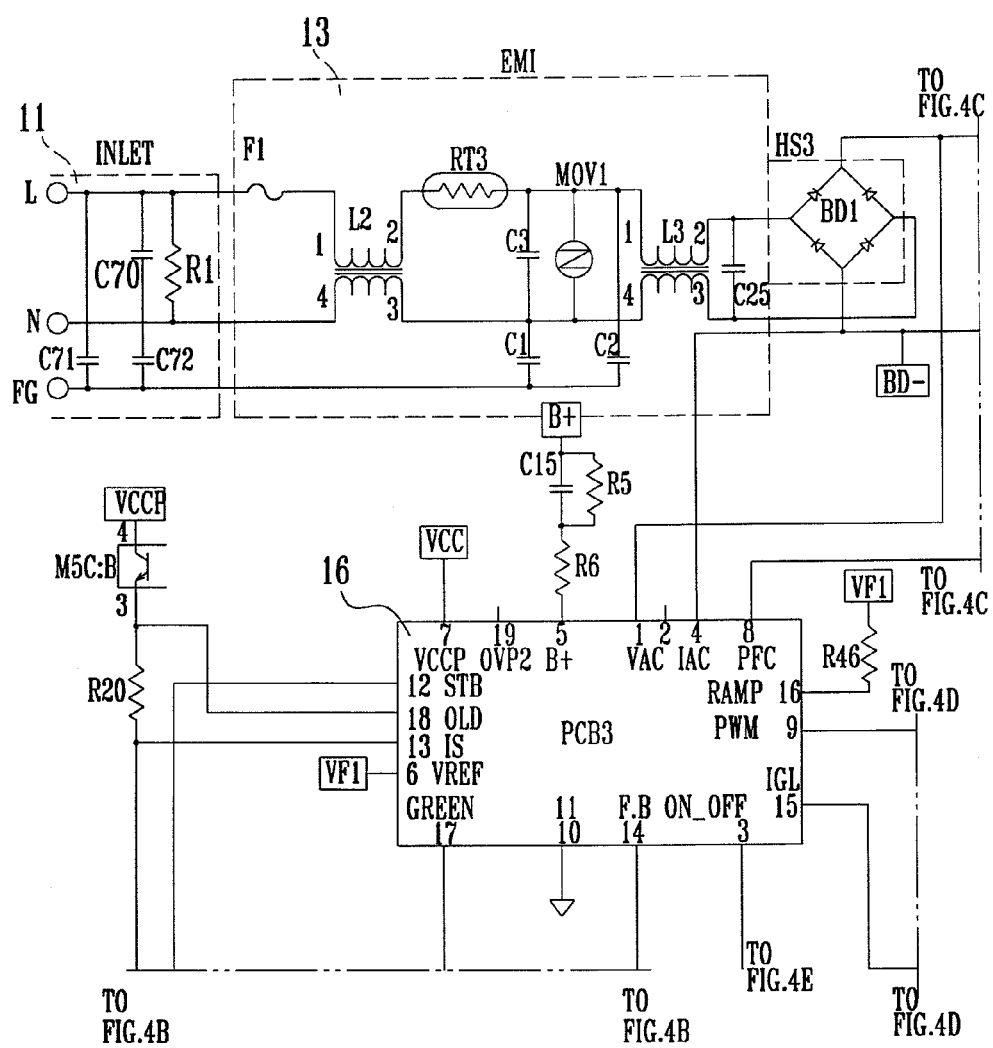
FIGS. 4A–4H show a circuit layout in accordance with this invention.
Figure 4B:
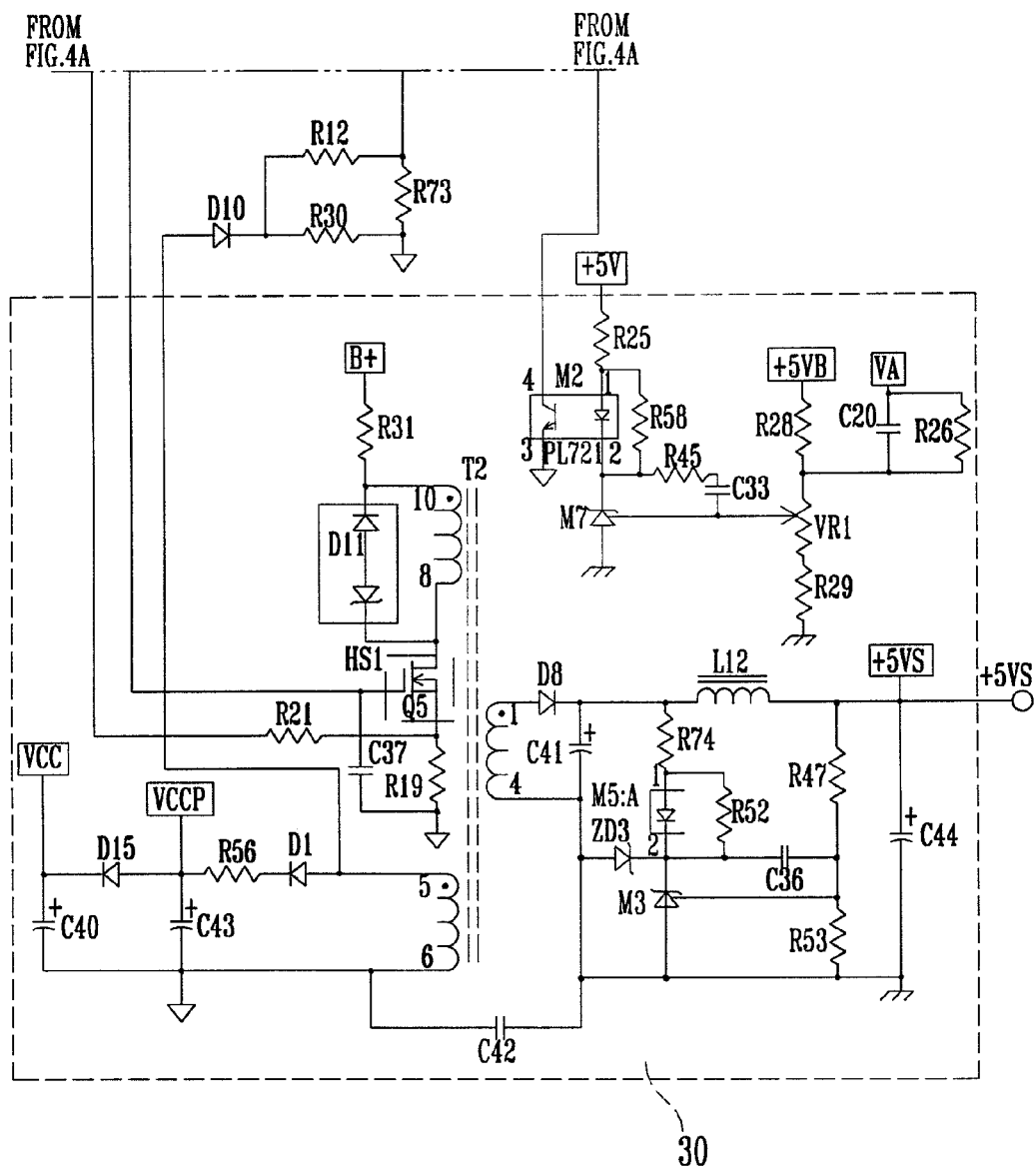
Figure 4C:
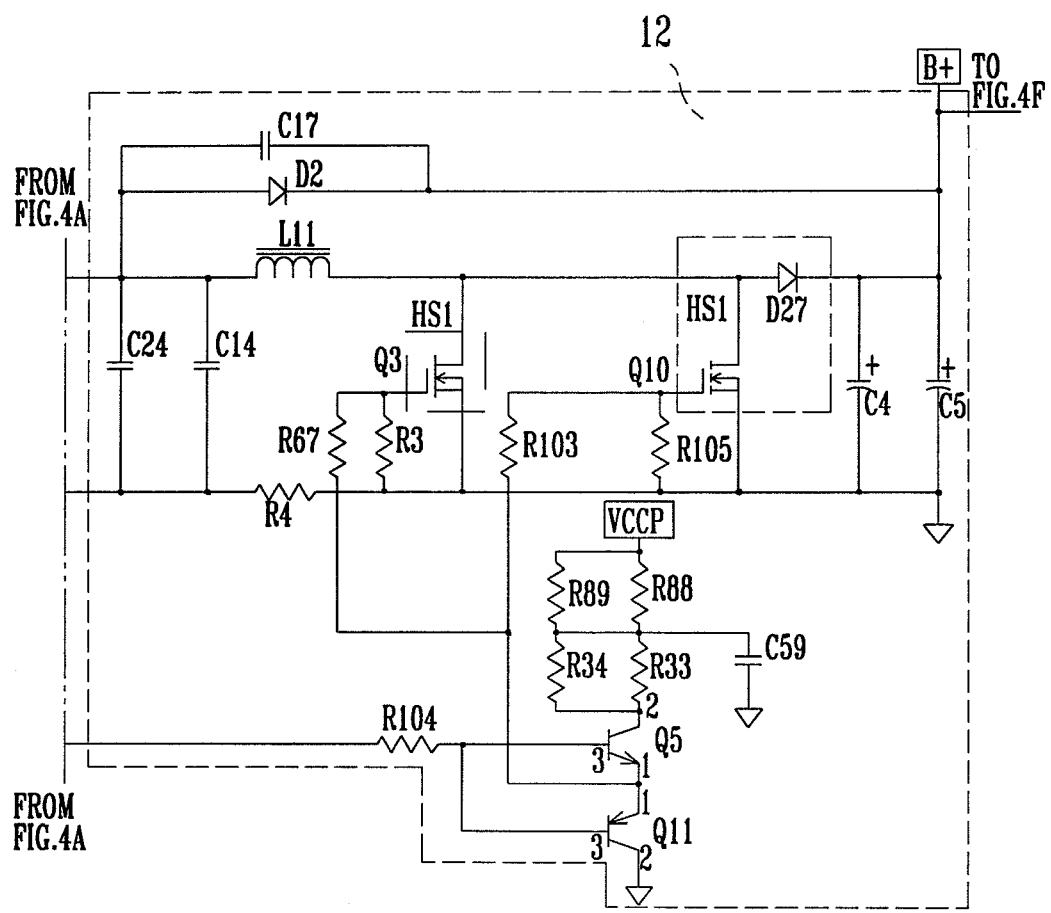
Figure 4D:
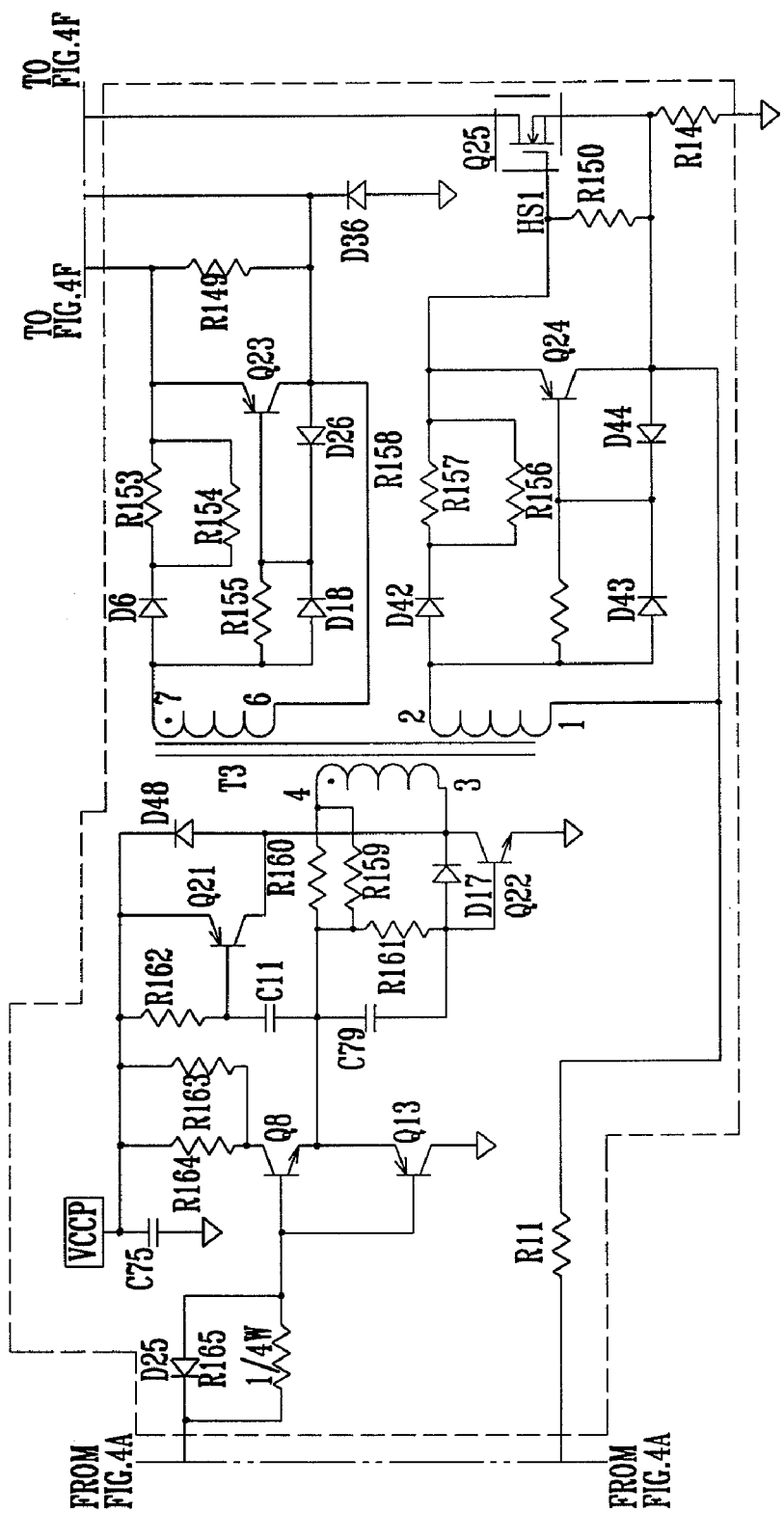
Figure 4E:
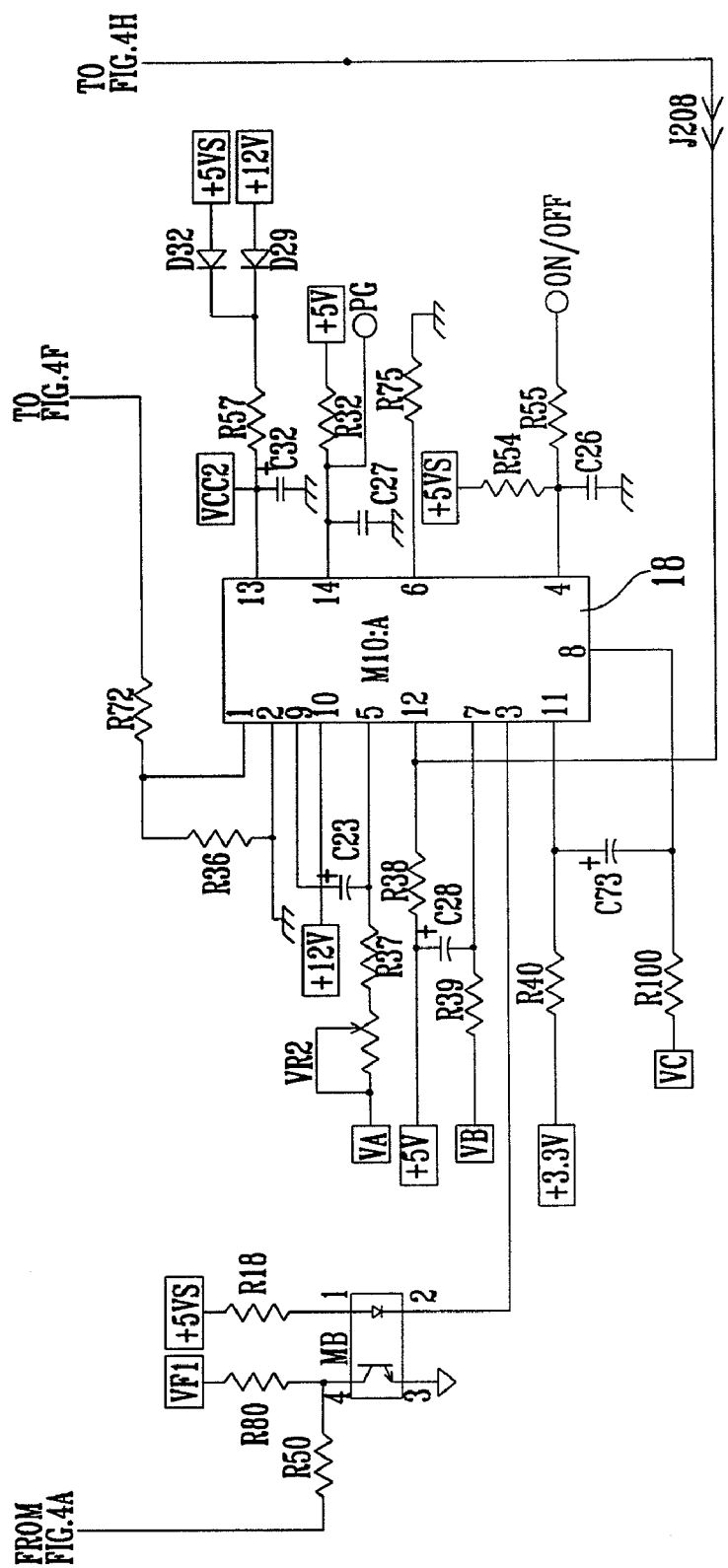
Figure 4F:
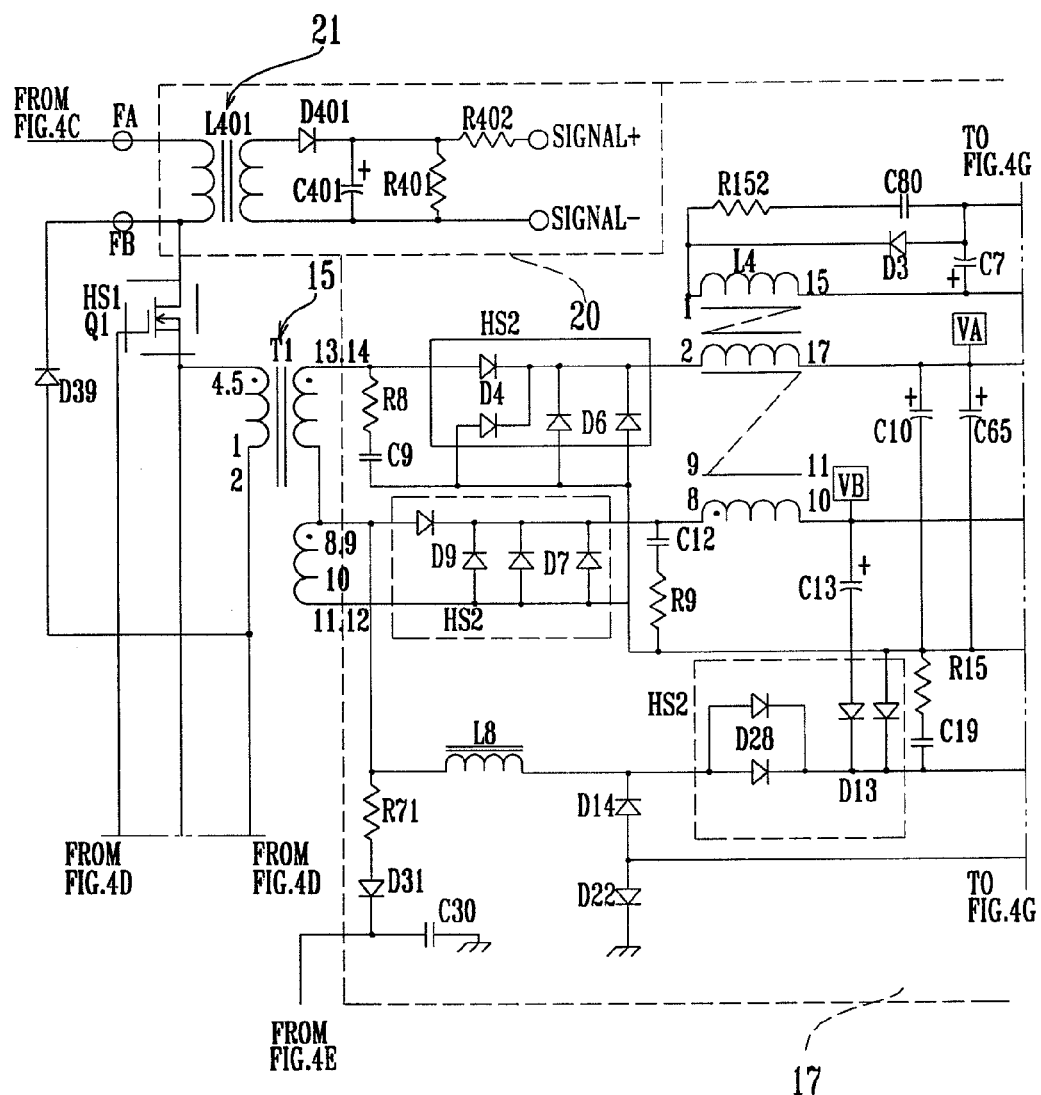
Figure 4G:
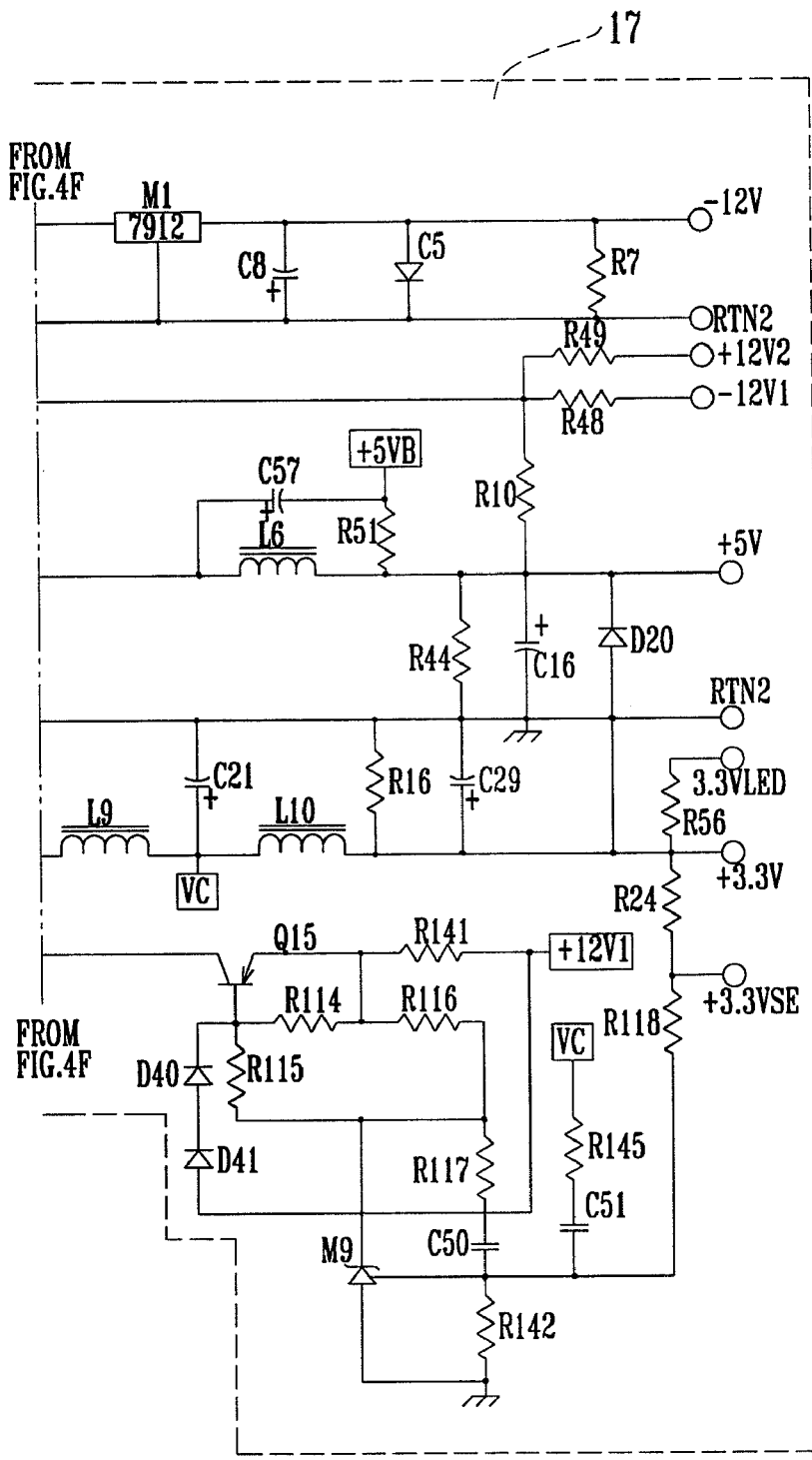
Figure 4H:
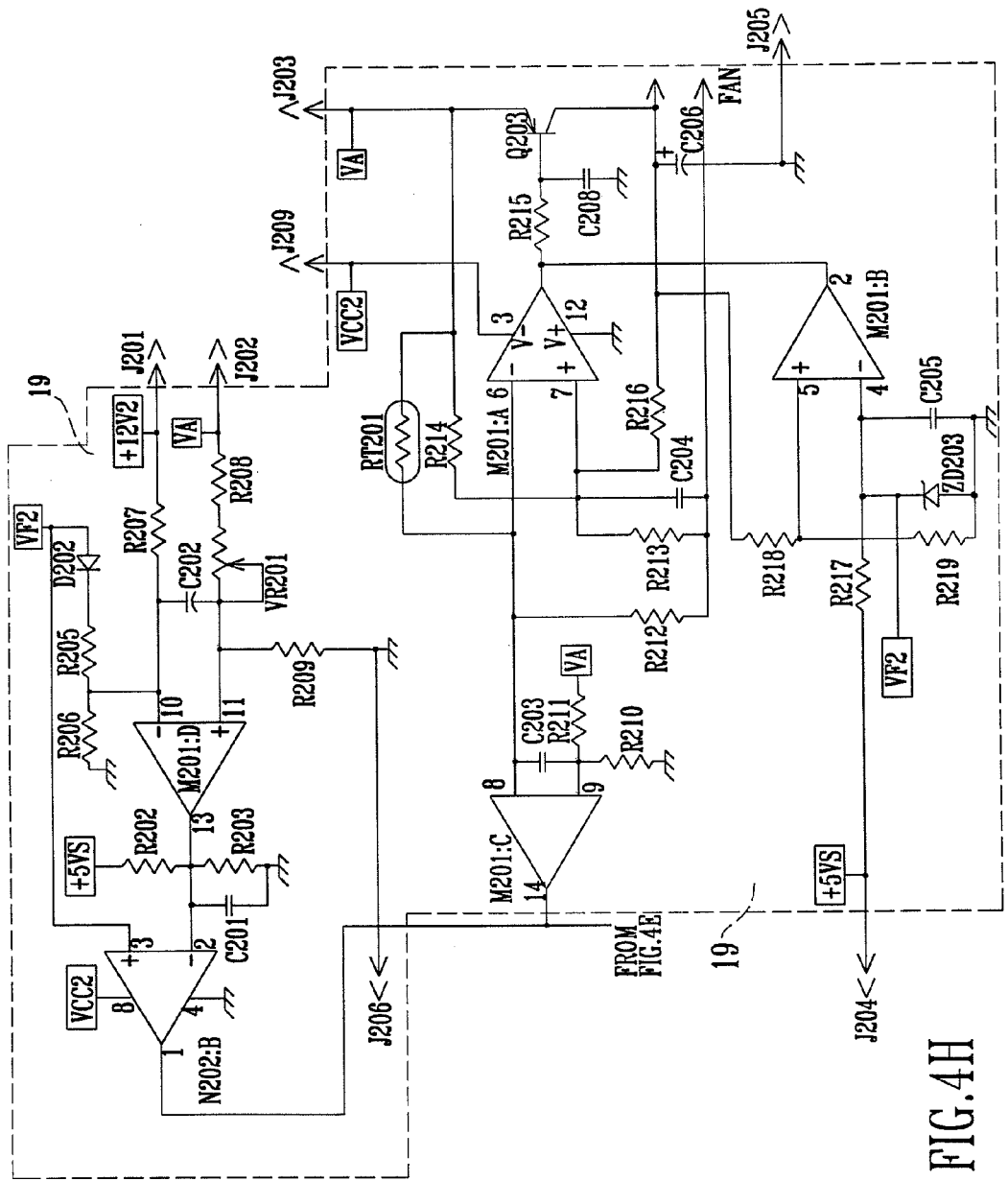

With reference to FIG. 3, a circuit block diagram in the computer power supply (10) has a rectifying circuit (11) with its input connected to an AC (Alternating Current) computer power supply to rectify the AC voltage supply. A power factor corrector (12) is connected to the rectifying circuit (11) through an EMI (Electromagnetic Interference) filter (13) to correct a power factor of a DC (Direct Current) voltage from the EMI filter and output high voltage to successive circuits. A transformer (15) has a primary coil and a secondary coil; a switching circuit (14) connected between the power factor corrector (12) and the primary coil of the transformer (15). A drive circuit (16) is coupled to both the power factor corrector (12) and the switching circuit (14), to indirectly determine a current direction flowing through the primary coil of the transformer through the switching circuit (14). A secondary coil voltage regulator (17) is connected with the secondary coil of the transformer (15) to transform and provide various DC voltage supplies. A linear rectifying circuit (20) as a major technique in accordance with this invention is coupled to an output of the power factor corrector (12) through a coupling coil (21) and connected to the display (100), so as to obtain a load current value and exhibit the result in the display. Furthermore, in this embodiment, a protective circuit (18) is coupled to the drive circuit (16). A fan control circuit (19) is connected with both the protective circuit (18) and at least one fan (190), to control the on-off state as well as rotate speed of the fan. A spare circuit (30) is set to provide computer power supply when the computer is de-activated.

FIGS. 4A–4H is a detailed circuit layout in accordance with this invention, wherein the linear rectifying circuit (20) consists of a diode, a capacitor and resistors, and the input is coupled to the output of the power factor corrector (12) through the coupling coil (21), thus the linear rectifying circuit (20) can obtain the load current value and exhibit the result in the display (100).

With reference to FIG. 2, the display (100) consists of a display panel and a pointer (103), wherein multiple-segment scales (101) (left part), (102) (right part) are in the display panel, and the pointer will indicate an accurate value in the scales (101), (102). To clearly notify the user that the power dissipation is higher than normal, the scales (101), (102) can be respectively presented with different colors, and LEDs (Light Emitting Diode) can be set at the back of the panel, by which the scale value will be easy to recognize.

Figure 5:
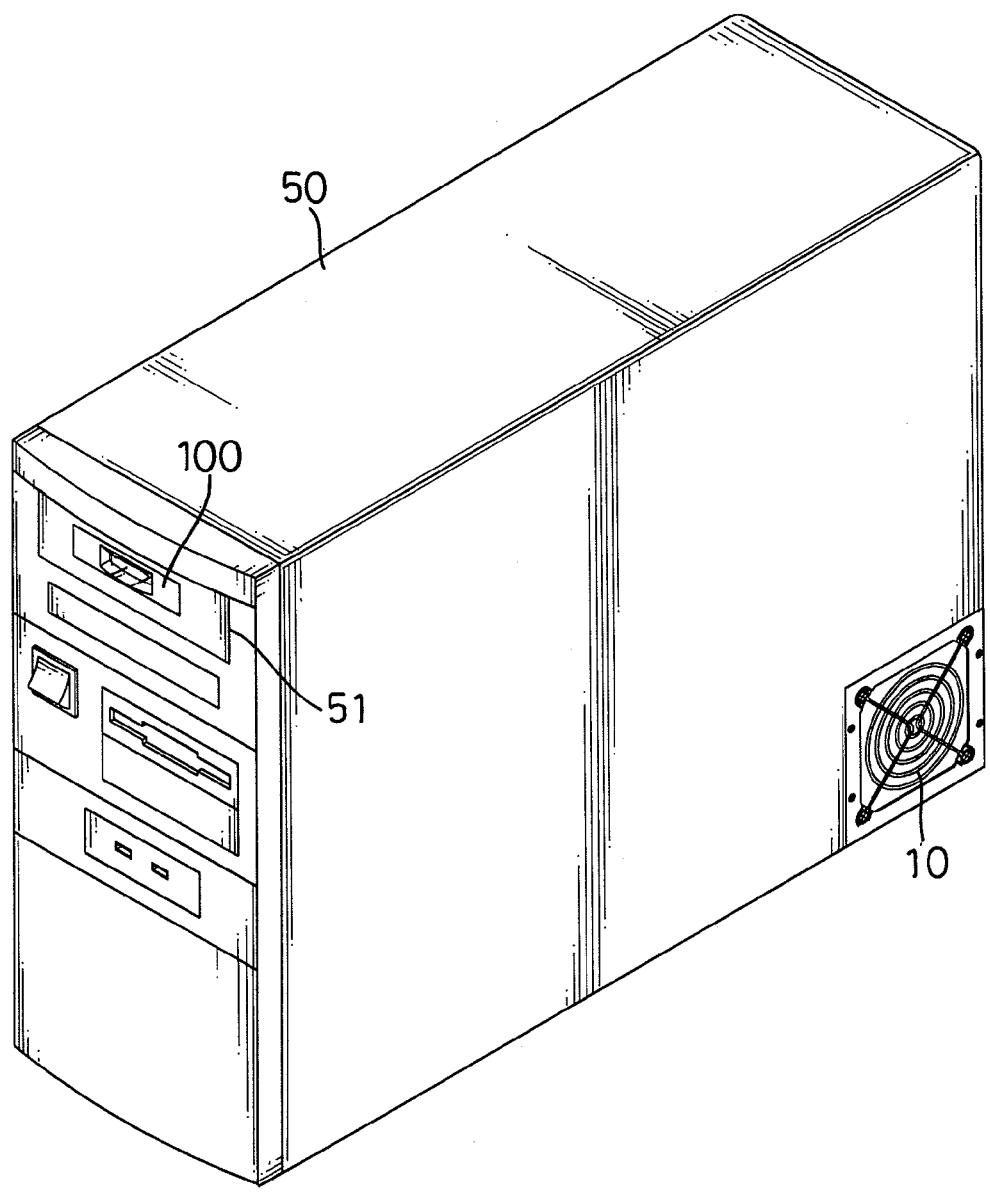
FIG. 5 is a perspective view in operation state in accordance with this invention.

In this embodiment, the display (100) is connected externally to the computer power supply (10) as shown in FIG. 5. The display is mounted in an expansion slot (51) on the front panel of the computer main frame (50), so the computer power supply information can be seen from the front panel as long as the computer power supply is on, independent of the operating system. If higher than normal power dissipation exists for a long time, a higher computer power supply may be required to keep the system stable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer power supply with a display function, the computer power supply connected with a display having a display panel and a pointer, wherein the display is coupled to an output of a power factor corrector through a linear rectifying circuit, whereby the operating power dissipation value is obtained and shown in the display.

2. The computer power supply with a display function as defined in claim 1, the computer power supply comprising:
 a rectifying circuit connected to an AC computer power supply;
 the power factor corrector connected to the rectifying circuit through an EMI (Electromagnetic Interference) filter to correct a power factor of a DC voltage from the EMI filter and to output a high voltage;
 a switching circuit connected between the power factor corrector and a primary coil of a transformer;
 a drive circuit connected to the power factor corrector and the switching circuit; and
 a secondary coil voltage regulator connected to a secondary coil of the transformer to transform and provide various DC voltages.

3. The computer power supply with a display function as defined in claim 2, wherein the linear rectifying circuit is coupled to the output terminal of the power factor corrector through a coupling coil.

4. The computer power supply with a display function as defined in claim 3, wherein the linear rectifying circuit consists of diodes, capacitors and resistors.

5. The computer power supply with a display function as defined in claim 4, wherein LEDs are mounted on a back face of the display panel.

6. The computer power supply with a display function as defined in claim 4, wherein multiple-segment scales are set in the display panel, and the pointer indicates an accurate scale corresponding to a power value of the power supply.

7. The computer power supply with a display function as defined in claim 6, wherein the display panel is divided into different colors based on the magnitude of the scales.

8. The computer power supply with a display function as defined in claim 7, wherein LEDs are mounted on a back face of the display panel.

* * * * *